(12) United States Patent
Walker

(10) Patent No.: US 12,541,087 B2
(45) Date of Patent: Feb. 3, 2026

(54) SPACE-BASED IMAGING FOR CHARACTERIZING SPACE OBJECTS

(71) Applicant: Arizona Board of Regents on Behalf of the University of Arizona, Tucson, AZ (US)

(72) Inventor: Christopher K. Walker, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 1433 days.

(21) Appl. No.: 16/258,596

(22) Filed: Jan. 26, 2019

(65) Prior Publication Data

US 2019/0235225 A1    Aug. 1, 2019

Related U.S. Application Data

(60) Provisional application No. 62/658,410, filed on Apr. 16, 2018, provisional application No. 62/622,778, filed on Jan. 26, 2018.

(51) Int. Cl.
*G02B 23/12* (2006.01)
*B64G 1/10* (2006.01)
(Continued)

(52) U.S. Cl.
CPC ............ *G02B 23/12* (2013.01); *B64G 1/1007* (2013.01); *G06T 7/70* (2017.01); *G06V 10/255* (2022.01);
(Continued)

(58) Field of Classification Search
CPC ............................ G02B 23/12; B64G 1/1007; B64G 2001/224; B64G 1/66; B64G 3/00;
(Continued)

(56) References Cited

U.S. PATENT DOCUMENTS

2007/0010972 A1*  1/2007  Praskovsky ........... G01S 13/951
                                                                                702/189
2009/0051772 A1*  2/2009  Rhoads .................. G02B 23/06
                                                                                359/558

(Continued)

FOREIGN PATENT DOCUMENTS

EP             2793043 A1 *  10/2014  .............. G01S 11/14

*Primary Examiner* — Tracy Y. Li
(74) *Attorney, Agent, or Firm* — Thomas | Horstemeyer, LLP

(57) ABSTRACT

Various examples are provided related to a space-based imaging approach for characterizing objects in space Earth or other planetary body. In one example, a method for characterizing objects in space includes illuminating an object in space about Earth or other planetary body with a narrow band, continuous wave (CW) radio beam transmitted by a transmitting telescope; receiving return signals from the object by receiving telescopes in an array, at least one receiving telescope in orbit; and generating a high resolution image of the object from the received return signals utilizing a near-field correction. In another example, a space-based imaging system includes an array of telescopes including a transmitting telescope that can illuminate an object in space; a plurality of receiving telescopes that receive return signals reflected by the object; and processing circuitry that generates a high resolution image of the object from the received return signals.

18 Claims, 5 Drawing Sheets

(51) Int. Cl.
*G06T 7/70* (2017.01)
*G06V 10/20* (2022.01)
*G06V 20/13* (2022.01)
*G06V 20/52* (2022.01)
*H04N 23/56* (2023.01)

(52) U.S. Cl.
CPC .............. *G06V 20/13* (2022.01); *G06V 20/52* (2022.01); *H04N 23/56* (2023.01)

(58) Field of Classification Search
CPC ........ G06T 7/70; G06V 10/255; G06V 20/13; G06V 20/52; H04N 5/2256
See application file for complete search history.

(56) References Cited

U.S. PATENT DOCUMENTS

| | | | |
|---|---|---|---|
| 2012/0105822 A1* | 5/2012 | Sandler | G01S 17/003 356/4.09 |
| 2013/0177322 A1* | 7/2013 | DeVaul | H04B 7/18504 398/131 |
| 2018/0003925 A1* | 1/2018 | Shmunk | G02B 3/0006 |

* cited by examiner

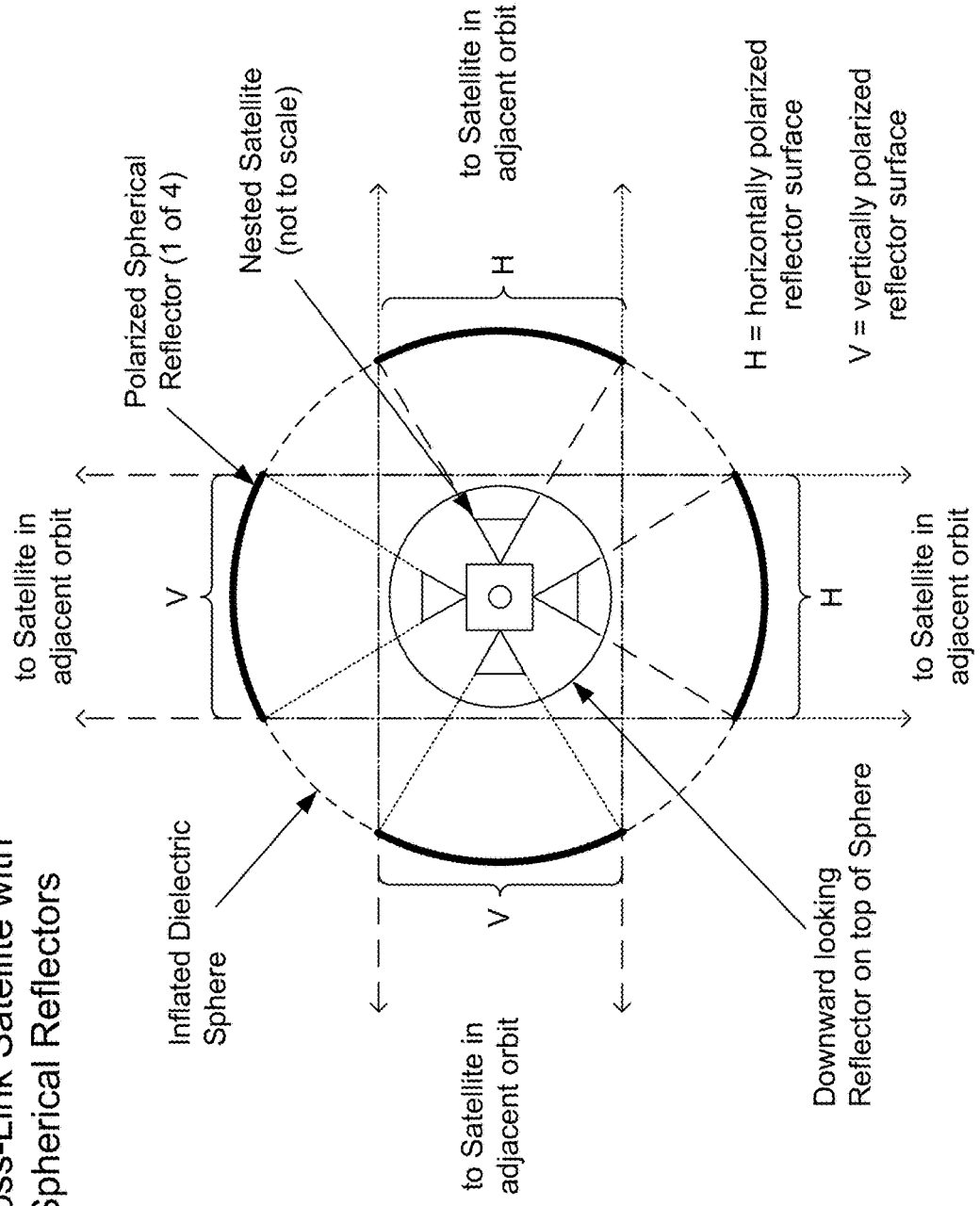

Satellite Cross-Link Orbital Configuration

SPACE-BASED IMAGING FOR CHARACTERIZING SPACE OBJECTS

CROSS REFERENCE TO RELATED APPLICATIONS

This application claims priority to, and the benefit of, U.S. provisional applications entitled "Multi-Static and VLBI Imaging Radar for Characterizing Space Objects" having Ser. No. 62/622,778, filed Jan. 26, 2018, and "Space-Based Imaging for Characterizing Space Objects" having Ser. No. 62/658,410, filed Apr. 16, 2018, both of which are hereby incorporated by reference in their entireties.

BACKGROUND

There are a large number of objects floating in orbit about the Earth. Given the number of objects, tracking and/or imaging them offers a unique set of problems. For example, thermal emission alone from satellites is insufficient to image them at high resolution at radio/THz frequencies, even when they are located in low Earth orbit (LEO). Traditional techniques for tracking are not sufficient to provide high resolution images and often miss small objects.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B illustrate examples of space-based telescopes, in accordance with various embodiments of the present disclosure.

DETAILED DESCRIPTION

Figure 1:
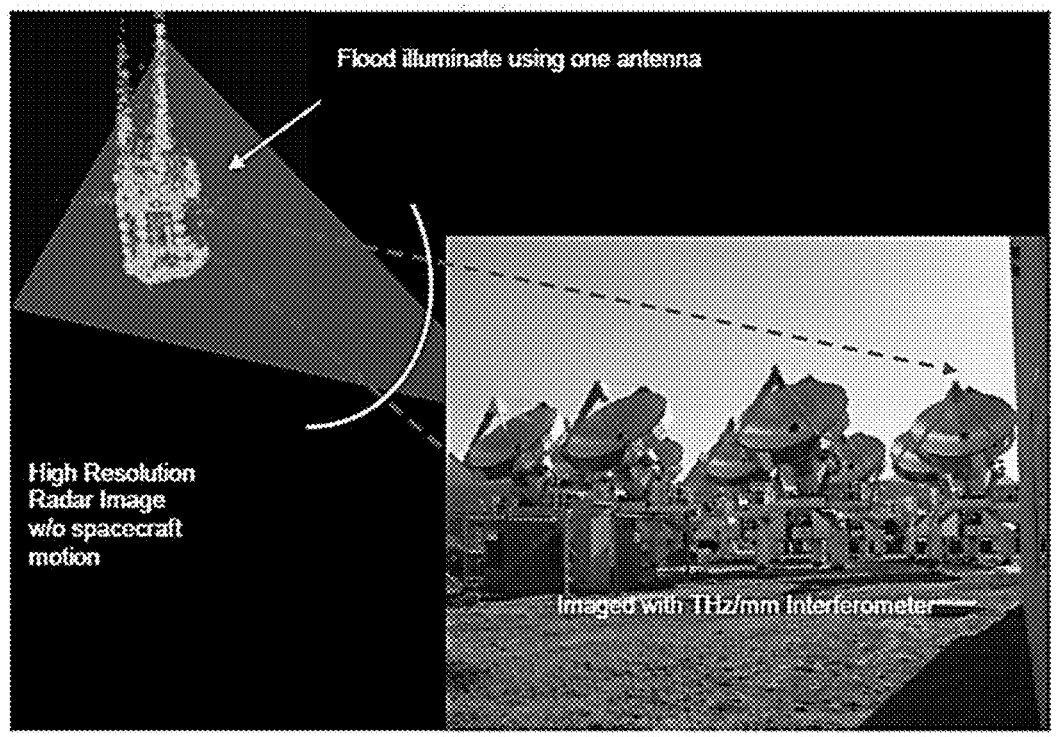
FIG. 1 illustrates an example of a system including a ground-based VBLI array of telescopes (or antennas) for imaging of objects in orbit, in accordance with various embodiments of the present disclosure.

Disclosed herein are various examples related to a space-based imaging approach for characterizing objects in space around the Earth or other planetary body. Very long baseline interferometry (VLBI) combined with multi-static radar and near-field correction techniques can be used to provide high resolution images of orbiting objects. While VLBI and radar technology have been in use for about 60 years, they have not been combined to image objects that are close to the Earth. While the discussion is primarily directed to orbit about the Earth, the discussion is also applicable to other planetary bodies. Reference will now be made in detail to the description of the embodiments as illustrated in the drawings, wherein like reference numbers indicate like parts throughout the several views. The components in the drawings are not necessarily to scale, emphasis instead being placed upon clearly illustrating the principles of the present disclosure.

As satellites are progressively getting smaller, they are becoming harder to both locate and track. For instance, cube satellites can become non-operational before being located and used for testing. In addition, space launch systems are capable of launching more satellites at a time than ever before. Thermal emission from the satellites does not provide the ability to image the satellite at a high resolution, even if located in low Earth orbit (LEO). This is exacerbated for satellites in geosynchronous Earth orbit (GEO) or lunar orbit (LO) which are difficult to image using existing ground-based arrays. All of these contribute to the ongoing satellite imaging problem.

FIG. 1 illustrates an example of a system including a ground-based VBLI array of telescopes (or antennas or stations) for imaging of objects in orbit. The multi-static/VLBI imaging system of FIG. 1 can include ground-based radio telescopes that use at least one ground transmitter to illuminate a target with a relatively low-power, continuous-wave (CW) signal. One or more of the telescopes (e.g., a transmitting telescope) can be configured to illuminate the object (e.g., a satellite) in orbit about the Earth. The transmitting antenna of the VLBI array can comprise a CW radar (e.g., a frequency modulated (FM) CW radar) to locate and track the object. The orientation of the transmitting telescope (or antenna) can then be adjusted to maintain the illumination of the object as it moves relative to the Earth.

With the CW beam directed at the object, returned signals are reflected back from the object and received by the other telescopes (or antennas) in the VLBI array. The receiving antennas can be of the tracking or stationary type, depending on the power levels being received. If the return power levels are low, higher quality images would be obtained by utilizing a high gain antenna that tracks the object under study. The returned signals received by the receiving telescopes can be subsequently processed to yield high resolution images of the object. Processing of the returned signal can be performed by processing circuitry (e.g., a processor, memory and other processing components) utilizing a near-field correction to yield the high resolution images. It is possible to obtain more detail and higher resolution images of an object when it is moving in relation to the VLBI array. Since GEO satellites are moving at the same rate as the Earth is rotating, they are more difficult to image.

Space-based imaging can be implemented by including one or more telescope (or antenna) in orbit about the Earth. For example, this can be achieved by augmenting the ground-based array of telescopes (or antennas or stations) of FIG. 1, with one or more receiving telescope (or antenna) in orbit about the Earth or other planetary body. By doing so, the number of interferometric baselines between the VLBI telescopes can be dramatically increased, thereby increasing the range of spatial frequencies contained in the resulting image and its quality. The orbiting telescopes can include one or more SmallSat SSA VLBI telescopes, which can be located, e.g., between low Earth orbit (LEO) and geosynchronous Earth orbit (GEO).

Figure 2:
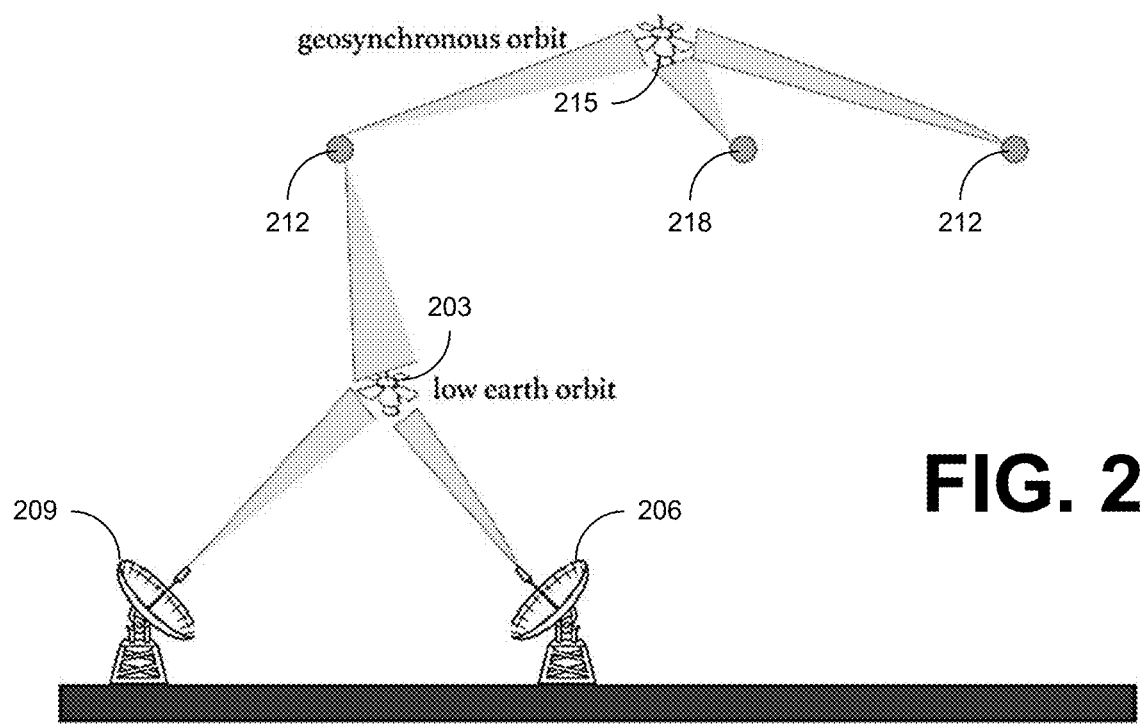
FIG. 2 is a graphical representation illustrating an example of a space-based imaging system, in accordance with various embodiments of the present disclosure.

This is illustrated in FIG. 2. In some implementations, a satellite 203 (e.g., in LEO, GEO, or LO) can be illuminated by one or more ground-based transmitting telescope 206, and the reflected signals are detected by one or more ground-based receiving telescope 209 and/or one or more orbiting receiving telescope 212. In other implementations, a satellite 215 (e.g., in LEO, GEO, or LO) can be illuminated by one or more orbiting transmitting telescope 218, and the reflected signals are detected by one or more orbiting receiving telescope 212. The reflected signals can also be detected by one or more ground-based receiving telescopes. By creating a constellation of such orbital telescopes and including a transmitter in at least one orbital telescope, the constellation can provide global coverage of GEO, LO, and near Earth objects in areas without ground-based telescopes.

The orbiting telescope 212/218 can include a Mylar (or other suitable dielectric film) balloon that inflates around a nested satellite. When deployed, the inflated Mylar balloon can include a spherical reflector that can direct signals to and/or from a transceiver (transmitter and/or receiver) of the satellite. By using polarized reflectors positioned at different locations around the Mylar balloon, the telescope 212/218 can receive and/or transmit signals based on the polarization. In some implementations, the orbiting telescopes 212/218 can be cross-linked to facilitate communications between the telescopes for the purpose of forming a VLBI imaging array.

This approach to space situational awareness (SSA) offers advantages over conventional satellite imaging techniques. By utilizing telescopes that are in orbit about the Earth, enhanced imaging resolution can be provided of near Earth objects (NEO) about the planet, including objects that are in low Earth orbit (LEO), or even objects in geosynchronous Earth orbit (GEO) or lunar orbit (LO). The transmitting telescopes can utilize relatively low power transmitters. For example, the transmitting telescope can be equipped with a transmitter (e.g., with a power output$\geq$1 W) to produce a high frequency, monochromatic, continuous wave (CW) radio beam for illumination. By utilizing a CW tone for illumination, satellite images can be obtained with far less transmitter power than possible when a more standard frequency swept or "chirp" pulse is utilized. Also, since the target is continuously illuminated long exposures can be achieved permitting high signal-to-noise ratio images to be obtained.

As discussed, several methods of radio telescopic imaging to create high resolution images. A technique can use a ground-based VLBI array of telescopes in conjunction with one or more space-based (or orbital) telescope. One or more of the telescopes in the VBLI array can be fit with a transmitter to illuminate an object of interest. The transmitter can produce low power (e.g., 1 W or more) continuous wave radio beams for illuminating the object. The remaining telescopes in the VLBI array and the space-based telescopes can receive the returned signal reflected by the illuminated object. The received signals can be processed with near-field correction to provide a high resolution image. For example, transmissions at about 230 GHz can provide spatial resolutions of about 0.3 cm for objects in LEO and of about 20-27 cm for objects in GEO.

Figure 3A:
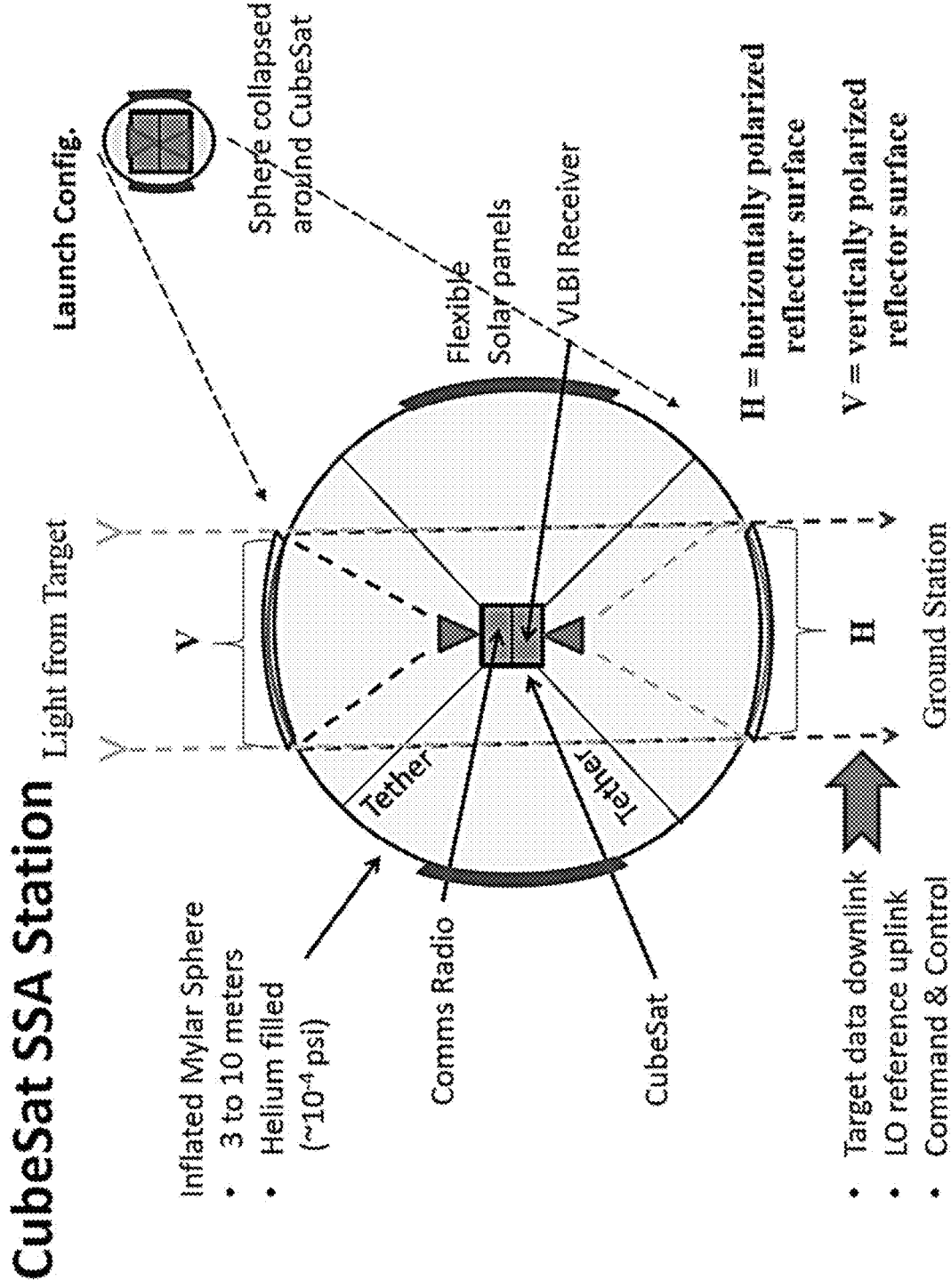

The space-based telescopes can be implemented as a CubeSat balloon satellite, such as Mylar balloon satellites, as illustrated in FIG. 3A. The Mylar balloon satellite can be packed into a small cube satellite and then inflated once in position. The shape of the balloon allows its surface to be configured into one or more spherical reflectors, which can be used as telescopes and/or telecom antennae. This approach to achieving space apertures increases the functionality of the system while also decreasing the weight. In other implementations, the Mylar balloon satellite can be designed with at least one cube satellite in its interior (and potentially supplementary equipment outside of the balloon), as illustrated in FIG. 3B. Alternatively, the balloon antenna can be inflated out of one of the CubeSat modules, such that the CubeSat is exterior to the balloon.

The balloon can have, e.g., a region of metallization above (or opposite) each antenna as illustrated in FIGS. 3A and 3B. The metallized coating can be horizontally or vertically polarized, allowing the satellite to communicate in multiple directions without interference. As shown in FIG. 3A, a lower section of the balloon is coated with a horizontally (H) polarized reflector surface that allows the signal reflected by the target or object of interest to be focused on the VLBI receiver. The upper section of the balloon is coated with a vertically (V) polarized reflector surface that allows signals from a communication radio to be communicated to a ground station (or telescope) for collection and processing. A small satellite or SmallSat (e.g., a CubeSat) can reside at the center of an inflated, thin film sphere (see, e.g., FIG. 3D). The SmallSat can contain a low-noise VLBI receiver and a telecom transceiver for data transfer to, e.g., a ground-based telescope (command and control). The antennas for the VLBI receiver and telecom transceiver can be formed by metallizing sections of the otherwise transparent sphere. The metallization patterns of the two antennas can be orthogonally polarized to allow an incoming signal (e.g., light) for the VLBI receiver to pass through the telecom antenna without interference. Likewise, the telecom signal from the Earth can pass through the VLBI antenna without significant attenuation.

Figure 3C:
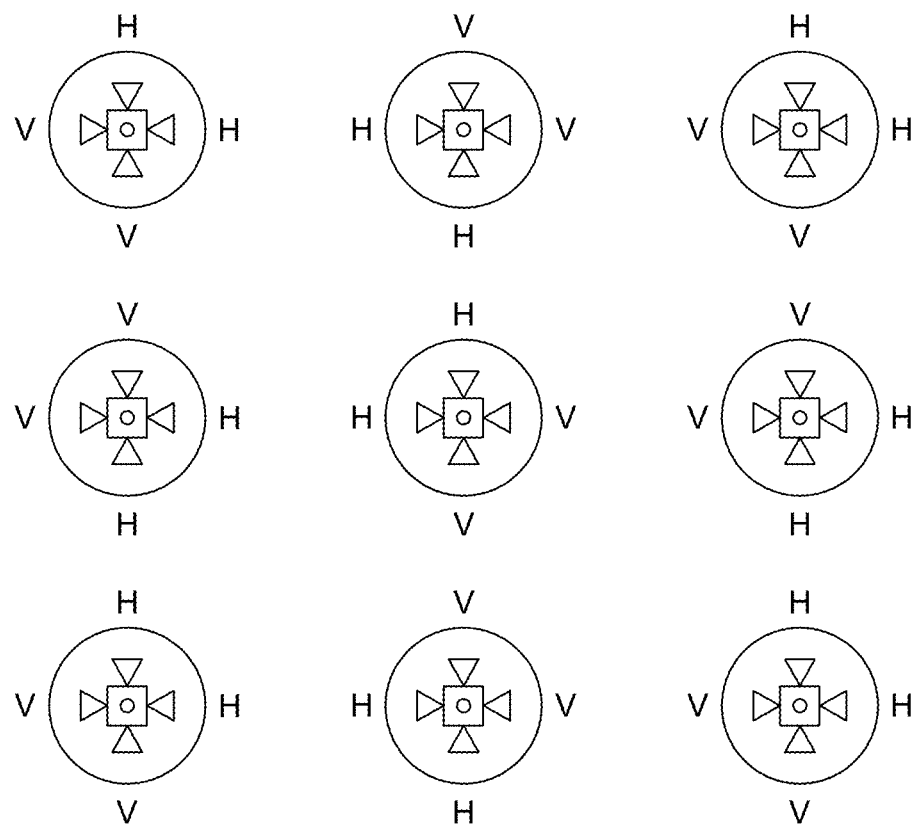
FIG. 3C shows an example of a cross-link configuration of space-based telescopes, in accordance with various embodiments of the present disclosure.
Figure 3D:
FIG. 3D includes an image of an example of two cross-linked space telescopes, in accordance with various embodiments of the present disclosure.

In the example of FIG. 3B, the balloon is coated at various locations around the middle section of the balloon to allow signals to be received from and/or transmitted to telescopes in adjacent orbits. Pairs of coatings on opposite sides of the nested satellite are horizontally (H) and vertically (V) polarized to allow signals with appropriate polarities to be transmitted to and/or received from the adjacent telescope. Using this configuration, it is possible to cross-link orbital satellites as shown in FIG. 3C, allowing for communications to be transmitted across a constellation of orbital satellites. Additional discussion regarding the orbital telescopes can be found in "CROSS-LINK SATELLITE WITH SPHERICAL REFLECTORS" (filed under PCT/US18/21872), which is hereby incorporated by reference in its entirety. An image of a balloon based telescope is shown in FIG. 3D. The horizontally (H) and vertically (V) polarized metallized coatings are visible on the balloon.

In some implementations, the orbiting telescope can include a phased array line feed for use with the balloon/spherical reflector to electronically target objects under study. Additional discussion regarding the orbital telescopes can be found in "PHASED ARRAY LINE FEED FOR REFLECTOR ANTENNA" (filed under PCT/US16/42462), which is hereby incorporated by reference in its entirety. The orbital telescopes can work in conjunction with an existing ground-based VLBI array, or can operate independently in the absence of a ground-based array. When fitted with their own beam transmitter, the orbital telescopes can operate similar to the ground-based array. When function in a cross-linked array, as illustrated in FIG. 3C and FIG. 3D, multiple orbital telescopes can illuminate the target or object of interest at the same time allowing for higher resolution imaging. The cross-linked communications allows for coordination of the telescope operations.

When a combination of ground-based VLBI telescopes and orbital telescopes, the object of interest can be illuminated and/or imaged from multiple angles. This ability allows for better imaging of GEO or LO objects. The ability to produce higher resolution images of objects in space allows for more accurate and speedier identification. This can contribute to better collision avoidance between orbiting objects. Potential applications include locating and imaging satellites, identifying and tracking moving objects (e.g., missiles or space vehicles), locating CubeSats and/or SmallSats (which may have been recently launched), and identifying space debris. Using a space-based system allows for imaging of objects in both LEO, GEO, and LO.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for characterizing objects in space, comprising:
    illuminating an object in space about Earth with a narrow band, continuous wave (CW) radio beam transmitted by a transmitting radio telescope;
    receiving return radio signals from the object by a plurality of receiving radio telescopes in an array, the return radio signals produced by reflection of at least a portion of the transmitted narrow band, CW radio beam by the object, the plurality of receiving radio telescopes comprising at least one receiving radio telescope satellite that receives a return radio signal reflected by the object, wherein the plurality of receiving radio telescopes in the array comprise a plurality of receiving radio telescope satellites in orbit about the Earth; and
    generating a high resolution image of the object from the received return radio signals utilizing a near-field correction.

2. The method of claim 1, wherein the plurality of receiving radio telescope satellites form a constellation of telescopes in orbit about the Earth.

3. The method of claim 1, wherein the plurality of receiving radio telescope satellites are cross-linked thereby allowing communications between the plurality of receiving radio telescope satellites.

4. The method of claim 1, wherein the at least one receiving radio telescope satellite is in low Earth orbit.

5. The method of claim 1, wherein the plurality of receiving radio telescopes comprise a ground-based telescope.

6. The method of claim 1, wherein the transmitting radio telescope is a radio telescope satellite in orbit about the Earth or other planetary body.

7. The method of claim 1, wherein the transmitting radio telescope is a ground-based telescope.

8. A method for characterizing objects in space, comprising:
    illuminating an object in space about Earth or other planetary body with a narrow band, continuous wave (CW) radio beam transmitted by a transmitting radio telescope, wherein the transmitting radio telescope comprises a phased array line feed that electronically steers the narrow band, CW radio beam;
    receiving return radio signals from the object by a plurality of receiving radio telescopes in an array, the return radio signals produced by reflection of at least a portion of the transmitted narrow band, CW radio beam by the object, the plurality of receiving radio telescopes comprising at least one receiving radio telescope satellite in orbit about the Earth or other planetary body and that receives a return radio signal reflected by the object; and
    generating a high resolution image of the object from the received return radio signals utilizing a near-field correction.

9. The method of claim 8, further comprising tracking the object with the transmitting radio telescope while illuminating the object.

10. A space-based imaging system, comprising:
    an array of telescopes comprising:
        a transmitting radio telescope that transmits a narrow band, continuous wave (CW) radio beam, thereby illuminating an object in space about Earth or other planetary body;
        a plurality of receiving radio telescopes that receive return radio signals reflected by the object, the return radio signals produced by reflection of at least a portion of the transmitted narrow band, CW radio beam by the object, where the plurality of receiving radio telescopes comprises a receiving radio telescope satellite in orbit about the Earth or other planetary body and that receives a return radio signal reflected by the object, wherein the receiving radio telescope satellite in orbit about the Earth or other planetary body is a balloon satellite comprising a nested transceiver configured to communicate with a ground-based receiver; and
        processing circuitry that generates a high resolution image of the object from the received return radio signals.

11. The space-based imaging system of claim 10, wherein the plurality of receiving radio telescopes comprises a plurality of receiving radio telescope satellites in orbit about the Earth or other planetary body.

12. The space-based imaging system of claim 11, wherein the plurality of receiving radio telescope satellites are a constellation of telescopes in orbit.

13. The space-based imaging system of claim 12, wherein the constellation of telescopes in orbit about the Earth include balloon satellites in a cross-linked orbital configuration.

14. The space-based imaging system of claim 10, wherein the plurality of receiving radio telescopes comprises at least one ground-based telescope.

15. The space-based imaging system of claim 10, wherein the transmitting radio telescope comprises a CW radar configured to track the object and control circuitry configured to adjust orientation of the transmitting telescope to maintain illumination of the object.

16. A space-based imaging system, comprising:
an array of telescopes comprising:
- a transmitting radio telescope that transmits a narrow band, continuous wave (CW) radio beam, thereby illuminating an object in space about Earth or other planetary body;
- a plurality of receiving radio telescopes that receive return radio signals reflected by the object, the return radio signals produced by reflection of at least a portion of the transmitted narrow band, CW radio beam by the object, where the plurality of receiving radio telescopes comprises a receiving radio telescope satellite in orbit about the Earth or other planetary body and that receives a return radio signal reflected by the object, where the plurality of receiving radio telescopes comprises a plurality of receiving radio telescope satellites in orbit about the Earth or other planetary body and, wherein the plurality of receiving radio telescope satellites in orbit include balloon satellites comprising a nested transceiver configured to communicate with adjacent balloon satellites; and
- processing circuitry that generates a high resolution image of the object from the received return radio signals.

17. The space-based imaging system of claim 16, wherein the transmitting radio telescope is in orbit or is a ground-based telescope.

18. The space-based imaging system of claim 17, wherein the transmitting radio telescope is configured to electronically steer the narrow band, CW radio beam.

* * * * *